United States Patent Office 3,374,214
Patented Mar. 19, 1968

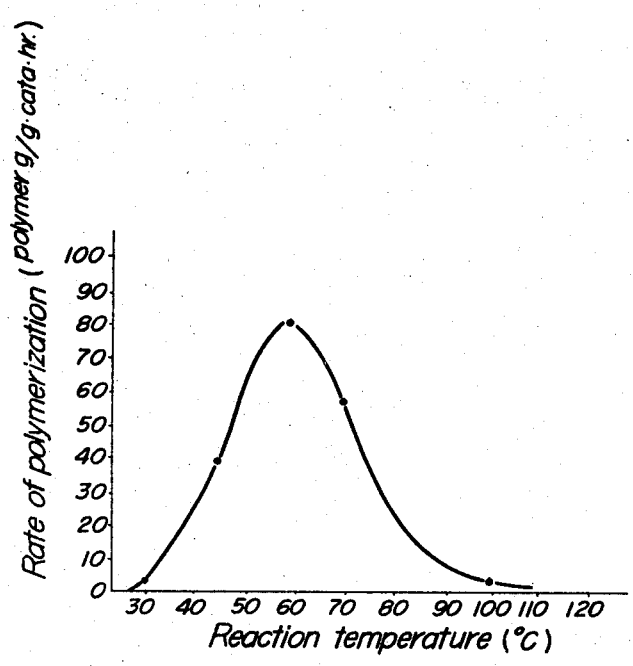

3,374,214
PROCESS FOR POLYMERIZING PROPYLENE USING A SOLID TERNARY CATALYST OF TITANIUM, ANTIMONY AND ALUMINUM
Itsuho Aishima and Yukichi Takashi, Nobeoka-shi, Japan, assignors to Asahi Kasei Kogyo Kabushiki Kaisha, Osaka, Japan, a corporation of Japan
Filed Nov. 26, 1963, Ser. No. 326,079
Claims priority, application Japan, Jan. 24, 1962, 37/52,844; May 22, 1963, 38/25,533; May 24, 1963, 38/26,267
26 Claims. (Cl. 260—93.7)

ABSTRACT OF THE DISCLOSURE

A process for the polymerization of propylene in the presence of a catalyst which contains no free aluminum trialkyl or alkyl aluminum halide and contains titanium, aluminum and antimony in an atomic ratio of $$1:0.05-0.5:0.001-0.1$$

The catalyst is prepared by first reacting titanium trichloride with $SbR_5$, $SbAlR_8$, $SbAl_2R_{11}$ or $$[SbR_4][Al_mR_nX_{3m-n+1}]$$

in an inert reaction medium at a temperature between room temperature and 150° C., removing the inert reaction medium from the solid part of the resulting product and then reacting the solid part with an aluminum trialkyl at a temperature between 30° C. and 100° C., separating the resulting solid product from the liquid phase at room temperature and washing the solid product with a hot aromatic hydrocarbon to remove therefrom any organoaluminum compounds, and thereby render the solid product free of aluminum trialkyl or alkyl aluminum halide.

---

This invention relates to a process for the production of crystalline polypropylene in the presence of a novel catalyst.

Heretofore many processes have been proposed for polymerizing olefins and the production of crystalline polypropylene has been accomplished in recent years by the discovery of heterogeneous catalysts.

These heterogeneous catalysts comprise, in general, crystalline compounds of transition metals and organometallic compounds. It has been reported that the presence of both the regular surface of a crystalline transition metal compound dispersed in a heterogeneous state and the free organometallic compound in the polymerization system are indispensable in obtaining highly crystalline polypropylene according to conventional methods.

We have been intensively studying processes for producing crystalline polypropylene which comprise polymerizing propylene in a polymerization system in which free organometallic compounds are not required, and we have now succeeded in establishing such a process based on the discovery of novel catalysts.

According to this invention, there is provided a process for the production of crystalline polypropylene which comprises polymerizing propylene with the use of a catalyst in the polymerization system wherein free aluminum trialkyl or aluminum alkyl halide is absent, the catalyst being a black, solid reaction product containing titanium aluminum and antimony in the atomic ratio of $$1:0.05-0.5:0.001-0.1$$

respectively, and being prepared by allowing (A) titanium trichloride to react in an inert reaction medium at a temperature between room temperature and 150° C. with (B) a compound or a complex selected from the group consisting of antimony pentalkyls having the general formula $SbR_5$ and organometallic complexes containing antimony and aluminum having the general formulae $SbAlR_8$, $SbAl_2R_{11}$ and $[SbR_4][Al_mR_nX_{3m-n+1}]$, wherein R represents an alkyl group of 1 to 7 carbon atoms; X represents one or two types of halogen atoms such as chlorine, bromine and iodine; $m$ represents 1 and 2; $n$ represents 0 and an integer of 1 to 3 when $m$ is 1 and $n$ represents 0 and an integer of 1 to 6 when $m$ is 2, the molar ratio of said compound or complex (B) to titanium trichloride being 0.001–1:1, removing the inert reaction medium from the solid part of the resultant product, subsequently allowing the remaining resultant solid product to react at a temperature between 30° C. and 100° C. in the absence of the inert reaction medium with an aluminum trialkyl having the general formula $AlR'_3$, wherein R' represents an alkyl group of 1 to 7 carbon atoms, the molar ratio of the aluminum trialkyl to titanium trichloride being 1–6:1, separating the solid reaction product from the resultant reaction product at room temperature and thereafter washing the solid product with a hot aromatic hydrocarbon to completely remove therefrom free aluminum compounds.

The active centers of the catalysts prepared under the abovementioned special conditions are fixed on a solid phase. As a result thereof, such catalysts work effectively by themselves without any co-catalyst such as an organometallic compound present in liquid phase in the polymerization system. Consequently, the present invention permits the polymerization of propylene using a solid catalyst, and avoids the dangerous procedure of simultaneously handling large amounts of inflammable solvents and monomer with organometallic compounds such as aluminum trialkyls which are spontaneously combustible. Furthermore, the present invention is advantageous in that the polymerization of propylene to a highly stereoregular crystalline polymer is effected using only single phase solid catalysts, giving good reproducibility of the polymerization and maintaining safety and simplicity of handling.

The antimony pentalkyls of the general formula $SbR_5$ employed in this invention may contain the same or different lower alkyl groups and include, for example, $Sb(C_2H_5)_5$, $Sb(CH_3)_5$, $Sb(C_2H_5)_4(C_4H_9)$.

These antimony pentalkyls may be prepared, for example, by allowing a trialkyl antimony halide or stibonium tetralkyl halide to react with a magnesium dialkyl, zinc dialkyl or lithium alkyl.

The following example of preparing antimony pentaethyl illustrates a representative procedure for the preparation of antimony pentalkyls.

According to a conventional method, 3.25 moles of magnesium ribbon and 3.20 moles of ethyl bromide are placed in a 3 l. four-neck flask equipped with a mercury-sealed stirrer, a dropping funnel, a Dimroth condenser and a thermometer, and are allowed to react in 750 cc. of ether while being stirred. After the reaction is completed, stirring is continued for 20 minutes more, after which 650 cc. of dioxan are added dropwise, and the resulting solid product is filtered off on a glass filter, and washed with 1.2 l. of ether under an atmosphere of nitrogen. The washing solution and the filtrate are combined to obtain a solution of magnesium diethyl. The magnesium diethyl solution is placed in a 3 l. reactor, similar to the abovementioned, and 0.75 mole of $(C_2H_5)_3SbCl_2$ is added dropwise with stirring over a period of about an hour. The reaction proceeds slowly with the evolution of heat, and as the reaction proceeds, a white, fine precipitate is produced, and the solution becomes yellow. After the dropping is completed, the solution is refluxed further for 1.5 hours with stirring to complete the reaction. Then, 200 cc. of water are added dropwise to the resultant reaction solution, with stirring at room temperature, to remove the unreacted magnesium alkyl compounds. Subsequently, the reaction product is washed with water several times and the organic layer is separated, dehydrated with Glauber's salt and then the organic solvent is distilled off. 160 g. of yellow liquid product are obtained. This substance is subjected to vacuum-distillation using a short-neck distillation apparatus and a distillate having a boiling point of 50.5° C./0.14 mm. Hg is separated. The results of elemental analysis of this distillate is shown in Table 1.

Table 1

|  | Sb | C | H | Total |
|---|---|---|---|---|
| Found (percent) | 45.54 | 44.51 | 9.71 | 99.76 |
| Calc'd. (percent) [for $Sb(C_2H_5)_5$] | 45.59 | 44.97 | 9.44 | 100.00 |

From this result, the product is identified as $Sb(C_2H_5)_5$ and the yield is 80%.

The complexes employed in this invention having the general formulae $SbAlR_8$ and $SbAl_2R_{11}$ contain similar and different lower alkyl groups and include, for example, $$SbAl(C_2H_5)_8, \; SbAl(C_2H_5)_5(CH_3)_3,$$
$$SbAl(CH_3)_5(C_2H_5)_3, \; SbAl(CH_3)_8,$$
$$SbAl_2(C_2H_5)_{11}, \; SbAl_2(C_2H_5)_5(CH_3)_6,$$
$$SbAl_2(CH_3)_5(C_2H_5)_6 \text{ and } SbAl_2(CH_3)_{11}$$

These novel organometallic complexes containing antimony and aluminum may be prepared by allowing an antimony pentaalkyl having the general formula $SbR_5$ to react with an aluminum trialkyl having the general formula $AlR_3$ at a temperature between −40° C. and 100° C.

The following examples of the preparation of $SbAl(C_2H_5)_8$ and $SbAl_2(C_2H_5)_{11}$ illustrate representative procedures for preparing the abovementioned organometallic complexes.

The complex having the formula $SbAl(C_2H_5)_8$ may be prepared quantitatively by allowing $Al(C_2H_5)_3$ to react with an excess of $Sb(CH_5)_5$.

Into a 50 cc. glass reactor equipped with a dropping funnel and a magnetic stirrer, 0.217 mol (57.85 g.) of antimony pentaethyl is charged, followed by 10 cc. of n-hexane and is allowed to react with 0.127 mole (14.46 g.) of $Al(C_2H_5)_3$ which is added dropwise from the dropping funnel while stirring the entire mixture at room temperature for about 20 minutes while the reactor is kept at a temperature of from 10° C. to 40° C. As the reaction proceeds, the solution separates into two layers. After allowing the reaction solution to stand overnight, it is washed and extracted with purified n-hexane, and 48.16 g. of a white n-hexane-insoluble crystalline material are obtained. The results of elemental analysis of the crystalline product thus obtained is shown in Table 2.

Table 2

|  | Sb | Al | C | H | Total |
|---|---|---|---|---|---|
| Found (percent) | 31.62 | 7.76 | 49.04 | 10.17 | 98.56 |
| Calc'd. (percent) [1] | 31.94 | 7.08 | 50.40 | 10.58 | 100.00 |

[1] This value is calculated for $SBAl(C_2H_5)_8$.

From these results, the crystalline product is identified as $SbAl(C_2H_5)_8$. The structure of this substance, although not as yet elucidated is presumed to be a novel ionic complex of the formula, $$[Sb(C_2H_5)_4]^+[Al(C_2H_5)_4]^-$$

The complex having the formula $SbAl_2(C_2H_5)_{11}$ may be prepared by allowing $Sb(C_2H_5)_5$ to react with an excess of $Al(C_2H_5)_3$, according to the same procedure used in preparing $SbAl(C_2H_5)_8$. The reaction product obtained by allowing 0.0717 mole of $Sb(C_2H_5)_5$ to react with 0.215 mole of $Al(C_2H_5)_3$ at a temperature between 10° C. and 40° C. is a colorless transparent n-hexane-insoluble liquid substance and the results of elemental analysis is shown as follows:

Table 3

|  | Sb | Al | C | H | Total |
|---|---|---|---|---|---|
| Found (percent) | 25.10 | 10.75 | 52.06 | 10.80 | 98.71 |
| Calc'd. (percent) [1] | 24.58 | 10.89 | 53.34 | 11.90 | 100.00 |

[1] This value is calculated for $SbAl_2(C_2H_5)_{11}$.

The structure of this substance is complicated and is presumed to have a novel chemical bond.

The complexes employed in this invention having the general formula $[SbR_4][Al_mR_nX_{3m-n+1}]$ include, for example,

[$Sb(C_2H_5)_4$][$AlCl_4$],
[$Sb(C_2H_5)_4$][$Al(C_2H_5)Cl_3$],
[$Sb(C_2H_5)_4$][$Al(C_2H_5)_2Cl_2$],
[$Sb(C_2H_5)_4$][$Al(C_2H_5)_3Cl$],
[$Sb(C_2H_5)_4$][$Al(C_4H_9)_2Br_2$],
[$Sb(C_3H_7)_4$][$Al_2(C_6H_{13})_4I_3$],
[$Sb(C_2H_5)_4$][$Al_2(C_2H_5)_5Cl_2$],
[$Sb(C_2H_5)_4$][$Al_2(C_2H_5)_5BrCl$],
[$Sb(C_2H_5)_4$][$Al_2(C_2H_5)_5Br_2$],
[$Sb(C_2H_5)_3(i-C_3H_7)$][$Al_2(i-C_3H_7)_5Cl_2$],
[$Sb(C_2H_5)_3(i-C_3H_7)$][$Al_2(i-C_3H_7)_5Cl_2$],
[$Sb(C_2H_5)_3(C_6H_{13})$][$Al_2(C_2H_5)_3(C_6H_{13})_2Cl_2$],
[$Sb(C_2H_5)_4$][$Al_2(C_2H_5)_6Cl$],
[$Sb(C_2H_5)_4$][$Al_2(C_2H_5)_6Br$],
[$Sb(C_2H_5)_4$][$Al_2(C_2H_5)_3(i-C_3H_7)_3Cl$],
[$Sb(C_2H_5)_4$][$Al_2(C_2H_5)_3(C_6H_{13})_3Cl$],
[$Sb(C_2H_5)_4$][$Al_2(C_2H_5)_3(i-C_4H_9)_3Cl$] and the like.

These complexes may be prepared by many processes. For example, according to the simple processes illustrated in Table 4, they can be stoichiometrically prepared.

Table 4—Methods for the preparation of $[SbR_4][Al_mR_nX_{3m-n+1}]$

| m | n | Complex | Preparation Method | Appearance | Solubility n-Hexane | Solubility Benzene |
|---|---|---|---|---|---|---|
| 1 | 0 | [SbEt₄][AlCl₄] | SbCl₃+Al(C₂H₅)₂Cl (excess) | White xtal., M.P. 182~185° C | Insol. | Slightly Sol. |
| 1 | 1 | [SbEt₄][AlEtCl₃] | SbEt₄Cl+AlEtCl₂ | White xtal., M.P.~35° C | Insol. | Do. |
| 1 | 2 | [SbEt₄][AlEt₂Cl₂] | SbEt₄Cl+AlEt₂Cl | Colourless liq. | Insol. | Do. |
| 1 | 3 | [SbEt₄][AlEt₃Cl] | SbEt₄Cl+AlEt₃ | do. | Insol. | Do. |
| 2 | 5 | [SbEt₄][Al₂Et₅Cl₂] | SbCl₃+AlEt₃ (excess) | do. | Insol. | Do. |
| 2 | 6 | [SbEt₄][Al₂Et₆Cl] | SbEt₄Cl+2AlEt₃ | do. | Insol. | Do. |

A series of these methods can be illustrated by giving a detailed example of preparing $$[Sb(C_2H_5)_4][Al(C_2H_5)Cl_3]$$

Into a 100 cc. four-neck flask, 13.7 g. (0.05 mole) of crystalline of $Sb(C_2H_5)_4Cl$ are charged together with 10 cc. of n-hexane under a nitrogen atmosphere and are allowed to react with 6.35 g. (0.05 mole) of $Al(C_2H_5)Cl_2$ dissolved in 40 cc. of n-hexane which is added dropwise thereto, while the inner temperature of the reactor is kept at −50° C. After addition, the temperature is kept at 50° C. and the reaction is continued with further stirring for about 30 minutes. Then the reaction solution is repeatedly washed with dry n-hexane, the n-hexane is distilled off, and 20 g. of colorless crystals melting at 34° C. to 36° C. are obtained.

From the elemental analysis shown in Table 5, the product is identified as $[Sb(C_2H_5)_4][Al(C_2H_5)Cl_3]$.

Table 5

|  | Sb | Al | Cl | C | H |
|---|---|---|---|---|---|
| Found (percent) | 29.69 | 6.59 | 26.90 | 28.49 | 5.96 |
| Calc'd. for [$Sb(C_2H_5)_4$][$Al(C_2H_5)Cl_3$] (percent) | 30.41 | 6.74 | 26.57 | 29.97 | 6.29 |

Other complexes may be prepared in good yields using similar processes.

The preferred aluminum trialkyls employed in this invention include, for example, aluminum triethyl, aluminum triisopropyl, aluminum tributyl, aluminum trihexyl and the like.

In carrying out the reaction of titanium trichloride with the aforementioned antimony compound or complex, it is necessary to contact both reactants in a reaction medium at a temperature between room temperature and 150° C. The preferred reaction medium is an inert hydrocarbon such as benzene, toluene, xylene and the like and an aliphatic hydrocarbon such as n-hexane, n-heptane and the like in which the aforementioned antimony compound or complex is soluble. The amount of the antimony compound or complex may vary from 0.001 to 1 mole, preferably from 0.01 to 0.1 mole per mole of titanium trichloride. If the amount of the antimony compound or complex is less than 0.001 mole per mole of titanium trichloride, an active catalyst cannot be obtained. On the other hand if the amount is more than 1 mole, the reaction with the aluminum trialkyl proceeds so vigorously that a highly active catalyst cannot be obtained. Thus, the solid reaction product obtained from titanium trichloride and the antimony compound or complex by the abovementioned procedure is separated from the inert reaction medium and is subsequently reacted with an aluminum trialkyl at a temperature between 30° C. and 100° C., preferably betwen 40° C. and 70° C. in the absence of the inert reaction medium. In this reaction the amount of the aluminum trialkyl must be sufficient, and accordingly, the preferred amount is within the range from 1 to 6 moles per mole of titanium trichloride employed in the previous step. After the reaction of the aluminum trialkyl with the solid reaction product obtained from the reaction between titanium trichloride and the antimony compound or complex the solid reaction product thereof is cooled and separated as promptly as possible and washed with a cold solvent, and subsequently with a hot inert organic solvent, for example benzene. By such a washing with hot benzene, the solid reaction product is rendered completely free of the free residual organic aluminum compounds which are soluble in hydrocarbon solvents. Thus, a black solid catalyst of high activity for the polymerization of propylene is obtained.

The polymerizing activity of the thus obtained solid catalyst depends upon the temperature of the reaction with aluminum trialkyl. If this temperature is below 30° C. or above 100° C., the resulting solid catalyst has a very poor activity for the polymerization. In order to prepare a catalyst of excellent activity, the reaction temperature should be in the range of 40° C. to 70° C. For example, when the solid reaction product prepared according to the procedure described below temperature between 30° C. and 120° C. is employed as catalyst for the polymerization of propylene using the same process as in Example 1, the polymerization rate changes as illustrated in the accompanying figure, which figure shows clearly the most suitable temperature range for preparing a catalyst.

The accompanying figure shows the relation between activity of the catalyst and the reaction temperature with aluminum trialkyl, the catalyst being prepared under the following conditions.

0.1 mole of TiCl$_3$ and 0.001 mole of

are added to 250 ml. of benzene and allowed to react at 80° C. for 3 hours, after which the benzene is completely removed therefrom by vacuum distillation. The resultant solid product is allowed to react with 0.50 mole of Al(C$_2$H$_5$)$_3$ at various temperatures for 48 hours. The solid reaction product thereof is cooled quickly and separated at room temperature, washed with cold benzene, subsequently washed and extracted with hot benzene to completely remove therefrom any remaining benzene-soluble organic aluminum compounds and dried under vacuum.

As is apparent from the figure, substantially active catalysts are not obtained at reaction temperatures below 30° C. In such cases, the solid reaction product yields very little crystalline polymer upon polymerization of propylene. When the reaction temperature is above 100° C., other unfavorable reactions occur. Thus, the solid reaction product has a very poor activity for the polymerization of propylene.

The method for preparing the catalyst employed in this invention is further explained in detail.

Because commercially available titanium trichloride contains a small amount of titanium tetrachloride, it is necessary to purify it by extraction and washing with benzene or by evacuation. One tenth of a mole of this purified titanium trichloride and 0.001 mole of a complex containing antimony and aluminum, for example,

are added to 300 ml. of purified benzene and then allowed to react at 60° C. for 6 hours. After that, the benzene is removed therefrom by vacuum distillation. 15 g. of the resultant substance are placed in a 250 ml. glass ampule and then an aluminum trialkyl, for example 50 g. of aluminum triethyl, is added thereto. The glass ampule is placed in a closed autoclave equipped with a bourdon gauge. The autoclave is settled in a water-bath maintained at 60° C., and the contents are allowed to react. The reaction proceeds promptly generating 1200 ml. of gas in 24 hours. This generated gas is found by gas chromatography to be mainly ethane.

After the reaction has proceeded for 48 hours, the reaction product is taken out under a nitrogen atmosphere, and washed with cold benzene at room temperature, and is subsequently washed with a large amount of hot benzene until substantially no aluminum alkyl compound can be detected in the washing solution.

The resultant solid reaction product is then extracted with hot benzene for 100 hours under a nitrogen atmosphere employing an Asahina type continuous extractor, and thereafter dried under vacuum. There are thus obtained 16 g. of the solid reaction product which is not sticky and is an almost black powder. The analytical data are shown in Table 6.

Table 6

| Atom | Sb | Al | Ti | Cl | C | H | Total |
|---|---|---|---|---|---|---|---|
| Analytical value (wt. percent) | 0.70 | 5.40 | 33.52 | 52.10 | 4.60 | 1.20 | 97.52 |
| Atomic ratio | 0.008 | 0.29 | 1.00 | 2.10 | 0.55 | 1.72 | |

(1) The methanol insoluble part of the solid reaction product amounted to 8.02%.

(2) The Ti and Al content of the methanol insoluble part per total sample was 2.54% and 0.89% respectively. This insoluble part is soluble in a mixed solution of sulfuric acid and hydrogen peroxide.

(3) The gas evolved when the solid reaction product was hydrolyzed was found to consist mainly of ethane, ethylene and hydrogen.

(4) A sample of the reaction product after hydrolysis was found to contain polyethylene. The polyethylene was detected by infra-red analysis.

As can be seen in the above table, the atomic ratio of chlorine to titanium in the solid product is about 2, and a considerable amount of aluminum is still present in the solid product although the solid product was sufficiently extracted and washed with boiling benzene. X-ray diffraction analysis indicates an increase in the background, which denotes the presence of amorphous substance, a considerable amount of TiCl$_3$, which is one of the starting materials, and new reflection patterns appear which were not initially observed.

Since the structure of the catalytically reactive compound or complex compound which is contained in the solid reaction product is considered to be extremely complicated, its structure cannot be confirmed from the above result, but even so, the following facts can be pointed out from the various experimentally obtained data:

(1) Free aluminum trialkyl or alkyl aluminum halide is not present in the solid reaction product because the product is sufficiently extracted and washed with boiling benzene, and crystalline aluminum trichloride is not detectable by X-ray measurement;

(2) A considerable amount of $TiCl_3$ is found in the solid reaction product by X-ray measurement;

(3) The atomic ratio of chlorine to titanium in the whole solid reaction product is about 2 or less. For example, as shown in Table 6, Cl/Ti is 2.10. That is, the sum of equivalent of chlorine and ethyl group only represents 2.38, even assuming that all the carbon atoms contained therein exist as ethyl groups. Assuming that aluminum atom present in the solid reaction product is predominantly bonded to ethyl group or chlorine atom in 3 equivalents by forming α-bond, summation of the equivalents of chlorine atom and ethyl group capable of bonding with titanium atom cannot exceed 1.51;

(4) The greater part of the solid reaction product is soluble in methanol.

From the above facts, and considering the X-ray measurements which indicate that a considerable amount of $TiCl_3$ is present in the solid reaction product, it is concluded that a compound or complex should be present wherein 0–1 atom of chlorine is bound to one titanium atom.

A compound or complex such as described above, that can exist in a stable form at room temperature, and which is soluble in methanol has not been known to date, and therefore, a certain new compound or complex which satisfies the valencies of aluminum, titanium and antimony might exist in the solid product.

It is therefore concluded that the reaction product used as the catalyst in this invention might partly contain a novel compound or complex.

The mechanism of the reactions involved in the preparation of the solid catalyst used in the invention has not yet been clarified, but it seems to be based on a specific property of an organo-metallic complex compound containing antimony and aluminum as an essential component in the preparation of the catalyst. That is, a metal-carbon bond present in the complex compound containing antimony and aluminum, such as

$$[Sb(C_2H_5)_4]^+[Al_2(C_2H_5)_5Cl_2]^-$$

which bonding differs from the metal-carbon bond found in conventional organo-metallic compounds, permits some kind of mutual reaction with titanium trichloride, and further this special mutual reaction between the solid reaction product thus obtained and aluminum trialkyl results in the production of a special solid catalyst which enables propylene to polymerize, yielding a crystalline polymer.

In polymerizing propylene using the solid reaction product thus obtained as the catalyst, propylene is contacted with the above described solid polymerization catalyst in the absence of oxygen or moisture, in an inert polymerization medium at an appropriate temperature to yield crystalline polypropylene.

Embodiments of the process of the invention will be illustrated as follows, using as the catalyst, the solid reaction product having the composition described in Table 6.

54 parts (parts represents parts by weight hereinafter) of a purified reaction medium such as n-hexane, corresponding to ½ of the volume of the reactor equipped with a stirrer are placed in the reactor, and then 0.2 part of the solid reaction product described in Table 6 as the catalyst is added and dispersed by stirring. While this reactor is heated at 60° C., propylene (purity 99.8%) is compressed thereinto so as to maintain the partial pressure of propylene at 3 kg./cm.² for 3 hours. After the reaction, the reactor is cooled and the remaining propylene is removed. Methanol is then added to the reaction mixture to decompose the remaining catalyst. The polymer obtained by the reaction is filtered, washed with methanol and water. The polymer, after drying, amounted to 33 parts of white solid polymer.

The polymer thus obtained is a white powder of intrinsic viscosity of 4.92 which value is obtained in tetralin solution at 135° C. X-ray measurement shows a 64% degree of crystallinity.

In carrying out the invention, a polymerization reaction medium is preferably employed. A reaction medium which is inert to the catalyst may be an aliphatic or aromatic hydrocarbon, or an alicyclic hydrocarbon such as butane, n-hexane, isooctane, benzene, toluene, cyclohexane, tetra hydronaphthalene, etc. The ratio of solvent to propylene can be arbitrarily defined depending on polymerization conditions, but generally is less than 20:1 by weight.

The amount of the solid catalyst used in the polymerization is preferably in the range of 0.01–5 wt. percent based on propylene to be polymerized.

Polymerization temperatures which produce a polymer of desirable molecular weight with a high polymerization rate are in the range of 15° C. to 120° C., especially from 40° C. to 80° C.

Polymerization pressure may also be chosen arbitrarily, and can be successfully employed in the range of 1 to 60 atm., generally from 1 to 20 atm.

EXAMPLE 1

Into a stainless steel autoclave having a volume of 300 cc., 150 cc. of n-hexane was introduced under a purified nitrogen atmosphere, and 0.3 g. of black colored solid reaction product having the composition as in Table 6 was further added, and the reactor was sealed. Subsequently, 21 g. of propylene was compressed thereinto and the reactor was shaken in a water-bath maintained at 70° C.

The internal pressure quickly decreased and after one hour, the pressure decrease ended. The reaction product was poured into 500 ml. of methanol. The catalyst was decomposed, washed, further boiled with a 30% HCl-methanol solution, washed with water, and dried to yield 19.5 g. of a white powdered polymer. The rate of polymerization at a partial pressure of propylene of 3 kg./cm.², calculated from the change of the reaction pressure, was 85 g./g. total catalyst/hr. The specific gravity of the polymer was 0.91. The degree of crystallinity of the polymer was 62%, as determined by X-ray analysis.

EXAMPLE 2

0.1 mole of purified titanium trichloride and 0.003 mole of antimony pentaethyl $Sb(C_2H_5)_5$ were placed in 300 ml. of purified n-hexane and reacted at 100° C. for 6 hours, after which the n-hexane was distilled off under vacuum.

15 g. of the thus obtained substance were placed in a glass ampule (volume: 250 ml.), and then 50 g. of aluminum triethyl were added at room temperature. They were allowed to react gently in an autoclave (equipped with Bouldon manometer) immersed in a water bath at 60° C. The reaction proceeded rapidly and 1000 ml. of gas were evolved over a period of 24 hrs. The gas evolved was found by gas chromatography to be mostly ethane.

After being allowed to react for 48 hours, the reaction product was taken out under a nitrogen atmosphere, filtered, and washed with cold benzene at room temperature, and then washed, with a large amount of hot benzene until no more aluminum alkyls could be detected in the washing solution. The solid reaction product was further extracted with hot benzene by using an Asahina continuous extraction apparatus for 24 hours under a nitrogen atmosphere, and thereafter dried under vacuum to separate 16 g. of solid reaction product. This solid reaction product which is a solid catalyst used in the invention is dry, black powder. The analytical data is shown in Table 7.

Table 7

| Atom | Sb | Ti | Al | Cl | C | H | Total |
|---|---|---|---|---|---|---|---|
| Analytical value (wt. percent) | 1.81 | 32.07 | 5.91 | 43.92 | 12.81 | 1.90 | 98.42 |
| Atomic ratio | 0.02 | 1.00 | 0.33 | 1.85 | 1.59 | 2.84 | |

150 cc. of n-hexane were introduced into a stainless steel autoclave (volume: 300 cc.) under a nitrogen atmosphere, and 0.5 g. of above black solid reaction product was added and the reactor was sealed. Subsequently, 21 g. of propylene was compressed into the autoclave. The autoclave was shaken in a water-bath maintained at 70° C.

The internal pressure decreased rapidly, and after one hour, the pressure decrease ended. The reaction product was poured into 500 ml. of methanol to decompose the catalyst, then washed, and thereafter boiled with a 30% HCl-methanol solution, washed with water and dried to yield 20 g. of a white, powdered polymer.

The rate of polymerization at a partial pressure of propylene of 3 kg./cm.$^2$, calculated from the change of the reaction pressure was 158 g./g. total catalyst/hr. The specific gravity of the polymer was 0.91. The degree of crystallinity of the polymer was 65%, as determined by X-ray analysis.

EXAMPLE 3

0.1 mole of purified titanium trichloride and 0.001 mole of $SbAl(C_2H_5)_8$ were added to 300 ml. of purified benzene and they were allowed to react at 30° C. for 6 hours, and thereafter the benzene was distilled off under vacuum.

15 g. of the thus obtained substance were placed in a glass ampule (volume: 250 ml.), and 50 g. of aluminum triethyl were added. They were allowed to react as in Example 2 and yielded 16 g. of solid reaction product. Analytical data of the black solid reaction product thus obtained is shown in Table 8.

Table 8

| Atom | Sb | Al | Ti | Cl | C | H | Total |
|---|---|---|---|---|---|---|---|
| Analytical value (wt. percent) | 0.68 | 5.60 | 34.28 | 51.93 | 5.00 | 1.30 | 98.79 |
| Atomic ratio | 0.008 | 0.29 | 1.00 | 2.04 | 0.58 | 1.82 | |

150 cc. of n-hexane was measured into a stainless steel autoclave (volume: 300 cc.) under a nitrogen atmosphere, and 0.3 g. of above black solid reaction product was added thereto.

The autoclave was sealed and subsequently, 21 g. of propylene were compressed into the autoclave maintained at 70° C. The autoclave was shaken to promote the polymerization.

The internal pressure decreased rapidly, and after one hour, the pressure decrease ended. The reaction product was poured into 500 cc. of methanol to decompose the catalyst, then washed, and thereafter boiled with a 30% HCl-methanol solution and then with water, and dried to yield 19.5 g. of white powdered polymer.

In the polymerization, the standard polymerization rate as mentioned before was 100 g./g. total catalyst/hr. The specific gravity of the polymer was 0.91. The degree of crystallinity of the polymer was 67%, as determined by X-ray analysis.

EXAMPLE 4

The same reaction was carried out as in Example 3 except that $SbAl_2(C_2H_5)_{11}$ was used instead of $SbAl(C_2H_5)_8$, and $Al(n-C_3H_7)_3$ instead of $Al(C_2H_5)_3$ to yield 16.2 g. of black powdered solid reaction product.

The composition of the solid reaction product is shown in Table 9.

Table 9

| Atom | Sb | Al | Ti | Cl | C | H | Total |
|---|---|---|---|---|---|---|---|
| Analytical value (wt. percent) | 0.69 | 5.72 | 32.93 | 53.21 | 4.60 | 1.23 | 98.38 |
| Atomic ratio | 0.008 | 0.31 | 1.00 | 2.18 | 0.56 | 1.79 | |

A glass ampule (about 15 ml.) was charged with 0.3 g. of the solid reaction product, the ampule was placed in a stainless steel autoclave (about 300 ml.). After adding 150 ml. of benzene to the autoclave, the autoclave was flushed with purified nitrogen. After cooling to −80° C., 21 g. of high purity propylene were condensed thereinto. The temperature was adjusted to 60° C., and maintained thereat. The ampule was broken and the autoclave was shaken. Polymerization proceeded quickly, and the internal pressure decreased after 1 hour.

The reaction product was treated as in Example 1 to yield 20 g. of a white powdered polymer. The specific gravity of the polymer was 0.91. The crystallinity thereof was 65%, as determined by X-ray measurement.

EXAMPLE 5

The same preparation of the solid catalyst was carried out as in Example 3 except that

was used instead of $SbAl(C_2H_5)_8$ to yield 15.7 g. of black powdered solid reaction product. The composition of the solid reaction product is shown in Table 10.

Table 10

| Atom | Sb | Al | Ti | Cl | C | H | Total |
|---|---|---|---|---|---|---|---|
| Analytical value (wt. percent) | 0.52 | 5.45 | 35.52 | 50.50 | 4.38 | 1.25 | 97.62 |
| Atomic ratio | 0.006 | 0.27 | 1.00 | 1.92 | 0.49 | 1.69 | |

A glass ampule (about 15 cc.) was charged with 0.3 g. of the solid reaction product, the ampule was placed in a stainless steel autoclave (volume: 300 cc.). After adding 150 cc. of benzene to the autoclave, the autoclave was flushed with purified nitrogen. After cooling to −80° C., 21 g. of high purity propylene were condensed thereinto, and the ampule was broken. The autoclave was shaken in a water-bath maintained at 60° C. The polymerization proceeded quickly, and the internal pressure decreased after 1 hour. The reaction product was treated as in Example 1 to yield 20 g. of a white powdered polymer.

The specific gravity of the polymer was 0.91, and the crystallinity of the polymer was 64%, as determined by X-ray measurement.

What we claim is:

1. A process for the polymerization of propylene which comprises polymerizing propylene in the presence of a catalyst, said catalyst being free of free aluminum trialkyl, or alkyl aluminum halide, and containing titanium, aluminum, and antimony in an atomic ratio of

1:0.05–0.5:0.001–0.1 respectively; said catalyst being prepared by reacting titanium trichloride with an antimony containing substance selected from the group consisting of $SbR_5$, $SbAlR_8$, $SbAl_2R_{11}$, and $[SbR_4]$ $[Al_mR_nX_{3m-n+1}]$, in an inert reaction medium at a temperature between room temperature and 150° C., wherein R is at least one alkyl group of 1–7 carbon atoms, X is at least one halogen atom selected from the group consisting of chlorine, bromine, and iodine, $m$ is an integer between 1 and 2, $n$ is an integer between 0 and 3 when $m$ is 1, and $n$ is an integer between 1 and 6 when $m$ is 2, the molar ratio of said substance to titanium trichloride being 0.001–1:1, removing the inert reaction medium from the solid part of the resultant product of the reaction between titanium trichloride and the antimony containing substance, reacting said solid part at a temperature between 30° C. and 100° C. with an aluminum trialkyl of the general formula $AlR'_3$, wherein R' is an alkyl group of 1–7 carbon atoms, and where the molar ratio of aluminum trialkyl to titanium trichloride is 1–6:1, the product of the reaction comprising a solid product in a liquid phase, separating said solid product from said liquid phase at room temperature, and washing said solid product with a hot aromatic hydrocarbon to remove therefrom any organoaluminum compounds, and thereby render said solid product free of free aluminum alkyl or alkyl aluminum halide.

2. A process as claimed in claim 1 wherein $SbR_5$ is $Sb(C_2H_5)_5$.

3. A process as claimed in claim 1 wherein $SbAlR_8$ is $SbAl(C_2H_5)_8$.

4. A process as claimed in claim 1 wherein $SbAl_2R_{11}$ is $SbAl_2(C_2H_5)_{11}$.

5. A process as claimed in claim 1 wherein $[SbR_4][Al_mR_nX_{3m-n+1}]$ is $[Sb(C_2H_5)_4][Al_2(C_2H_5)Cl_2]$.

6. A process as claimed in claim 5 wherein the molar ratio of titanium trichloride to $[Sb(C_2H_5)_4][Al_2(C_2H_5)_5Cl_2]$ is 1:0.01, the inert reaction medium is benzene, and the aluminum trialkyl is aluminum triethyl.

7. A process as claimed in claim 6 wherein the molar ratio of titanium trichloride to aluminum triethyl is 1:5, and the reaction between the solid part of the resultant product of the reaction between titanium trichloride and $[Sb(C_2H_5)_4][Al_2(C_2H_5)_5Cl_2]$, and aluminum triethyl is conducted at 60° C.

8. A process as claimed in claim 1 wherein $[SbR_4][Al_mR_nX_{3m-n+1}]$ is $[Sb(C_2H_5)_4][Al_2(C_2H_5)_6Cl]$.

9. A process as claimed in claim 1 wherein $[SbR_4][Al_mR_nX_{3m-n+1}]$ is $[Sb(C_2H_5)_4][Al(C_2H_5)Cl_3]$.

10. A process as claimed in claim 1 wherein the aluminum trialkyl is aluminum triethyl.

11. A process as claimed in claim 1 wherein the inert reaction medium is benzene when the antimony containing substance is other than $SbR_5$.

12. A process as claimed in claim 1 wherein the inert reaction medium is n-hexane when the antimony containing substance is $SbR_5$.

13. A process as claimed in claim 1 wherein the polymerization is conducted in a solvent selected from the group consisting of n-hexane, n-heptane, benzene, xylene, and cyclohexane.

14. A process as claimed in claim 1 wherein propylene is polymerized at a temperature between 40° C. and 80° C., and the partial pressure of propylene is maintained between 1 and 10 atm.

15. A process for the production of a polymerization catalyst containing titanium, aluminum and antimony in the atomic ratio of 1:0.05–0.5:0.001–0.1 respectively, which comprises reacting titanium trichloride with an antimony containing substance selected from the group consisting of $SbR_5$, $SbAlR_8$, $SbAl_2R_{11}$ and $[SbR_4][Al_mR_nX_{3m-n+1}]$ in an inert reaction medium at a temperature between room temperature and 150° C., wherein R is an alkyl group of 1–7 carbon atoms, X is at least one halogen atom selected from the group consisting of chlorine, bromine, and iodine, m is an integer between 1 and 2, n is an integer between 0 and 3 when m is 1, and n is an integer between 1 and 6 when m is 2, and where the molar ratio of said substance to titanium trichloride is 0.001–1:1; removing the inert reaction medium from the solid part of the resultant product of the reaction between titanium trichloride and the antimony containing substance, reacting said solid part at a temperature between 30° C. and 100° C. with an aluminum trialkyl of the general formula $AlR'_3$, wherein R' is an alkyl group of 1–7 carbon atoms, and where the molar ratio of aluminum trialkyl to titanium trichloride is 1–6:1, the product of the reaction comprising a solid product in a liquid phase, separating said solid product from said liquid phase at room temperature, and washing said solid product with a hot aromatic hydrocarbon to remove therefrom any organoaluminum compounds and thereby render said solid product free of free aluminum alkyl or alkyl aluminum halide.

16. A process as claimed in claim 15 wherein $SbR_5$ is $Sb(C_2H_5)_5$.

17. A process as claimed in claim 15 wherein $SbAlR_8$ is $SbAl(C_2H_5)_8$.

18. A process as claimed in claim 15 wherein $SbAl_2R_{11}$ is $SbAl_2(C_2H_5)_{11}$.

19. A process as claimed in claim 15 wherein $[SbR_4][Al_mR_nX_{3m-n+1}]$ is $[Sb(C_2H_5)_4][Al_2(C_2H_5)_5Cl_2]$.

20. A process as claimed in claim 19 wherein the molar ratio of titanium trichloride to $[Sb(C_2H_5)_4][Al_2(C_2H_5)_5Cl_2]$ is 1:0.01, the inert reaction medium is benzene, and the aluminum trialkyl is aluminum triethyl.

21. A process as claimed in claim 20 wherein the molar ratio of titanium trichloride to aluminum triethyl is 1:5, and the reaction between the solid part of the resultant product of the reaction between titanium trichloride and $[Sb(C_2H_5)_4][Al_2(C_2H_5)_5Cl_2]$, and aluminum triethyl is conducted at 60° C.

22. A process as claimed in claim 15 wherein $[SbR_4][Al_mR_nX_{3m-n+1}]$ is $[Sb(C_2H_5)_4][Al_2(C_2H_5)_6Cl]$.

23. A process as claimed in claim 15 wherein $[SbR_4][Al_mR_nX_{3m-n+1}]$ is $[Sb(C_2H_5)_4][Al(C_2H_5)Cl_3]$.

24. A process as claimed in claim 15 wherein the aluminum trialkyl is aluminum triethyl.

25. A process as claimed in claim 15 wherein the inert reaction medium is benzene when the antimony containing substance is other than $SbR_5$.

26. A process as claimed in claim 15 wherein the inert reaction medium is n-hexane when the antimony containing substance is $SbR_5$.

References Cited

UNITED STATES PATENTS

| | | | |
|---|---|---|---|
| 3,293,228 | 12/1966 | Takashi et al. | 260—93.7 |
| 3,058,963 | 10/1962 | Vandenberg | 260—94.9 |
| 3,014,016 | 12/1961 | Natta | 260—93.7 |
| 3,047,557 | 7/1962 | Rust | 260—93.7 |
| 3,081,287 | 3/1963 | Coover | 260—93.7 |
| 3,118,865 | 1/1964 | Bruce | 260—93.7 |
| 3,207,734 | 9/1965 | Tsunoda | 260—93.7 |

FOREIGN PATENTS 233,098  2/1959  Australia.

JOSEPH L. SCHOFER, *Primary Examiner.*

M. B. KURTZMAN, *Assistant Examiner.*

UNITED STATES PATENT OFFICE

CERTIFICATE OF CORRECTION

Patent No. 3,374,214            March 19, 1968

Itsuho Aishima et al.

It is certified that error appears in the above identified patent and that said Letters Patent are hereby corrected as shown below:

In the heading to the printed specification, line 9, "Jan. 24, 1962" should read -- Nov. 24, 1962 --. Column 11, line 19, "$[Al_2(C_2H_5)Cl_2]$" should read -- $[Al_2(C_2H_5)_5Cl_2]$ --.

Signed and sealed this 14th day of October 1969.

(SEAL)
Attest:

Edward M. Fletcher, Jr.            WILLIAM E. SCHUYLER, JR.

Attesting Officer                 Commissioner of Patents